United States Patent [19]

Höfer et al.

[11] 4,352,008
[45] Sep. 28, 1982

[54] ELECTRIC HEATING DEVICE FOR HEATING THE INTERIOR OF A SWITCH CABINET

[75] Inventors: Edwin Höfer, Bellheim; Helmut Ohnmacht, Kandel, both of Fed. Rep. of Germany

[73] Assignee: Firma Fritz Eichenauer, Kandel, Fed. Rep. of Germany

[21] Appl. No.: 108,784

[22] Filed: Dec. 31, 1979

[30] Foreign Application Priority Data

Jan. 26, 1979 [DE] Fed. Rep. of Germany ....... 2902090

[51] Int. Cl.³ .................. H05B 3/50; F24H 7/06; F28F 1/16
[52] U.S. Cl. .................. 219/540; 165/80 B; 165/183; 165/185; 219/209; 219/345; 219/365; 219/505; 219/526; 219/536
[58] Field of Search ............. 219/530, 540, 504, 505, 219/526, 210, 365, 209, 536, 345; 338/22 R; 165/183, 181, 185, 80 R, 80 B

[56] References Cited

U.S. PATENT DOCUMENTS

| | | | |
|---|---|---|---|
| 1,660,218 | 2/1928 | Burgher | 219/540 |
| 1,884,585 | 10/1932 | Crossley | 219/210 |
| 2,683,209 | 7/1954 | Beckjord | 219/540 X |
| 2,861,163 | 11/1958 | Asakawa | 219/504 X |
| 3,194,944 | 7/1965 | Papp | 219/526 X |
| 3,243,753 | 3/1966 | Kohler | 219/505 X |
| 3,338,476 | 8/1967 | Marcoux | 219/505 X |
| 3,396,458 | 8/1968 | Meng et al. | 219/540 X |
| 3,564,199 | 2/1971 | Blaha | 219/505 X |
| 3,748,439 | 7/1973 | Ting et al. | 219/505 X |
| 3,824,328 | 7/1974 | Ting et al. | 338/22 R |
| 3,940,591 | 2/1976 | Ting | 219/544 |
| 4,091,267 | 5/1978 | Grant | 219/544 |

FOREIGN PATENT DOCUMENTS

| | | | |
|---|---|---|---|
| 704047 | 2/1965 | Canada | 219/365 |
| 7323567 | 9/1973 | Fed. Rep. of Germany | 219/209 |
| 2525367 | 12/1976 | Fed. Rep. of Germany | 219/540 |
| 2531692 | 2/1977 | Fed. Rep. of Germany | 219/540 |
| 2855645 | 7/1979 | Fed. Rep. of Germany | 219/209 |
| 2832959 | 2/1980 | Fed. Rep. of Germany | 219/209 |
| 71739 | 7/1959 | France | 219/345 |
| 224916 | 3/1943 | Switzerland | 219/365 |
| 219497 | 7/1924 | United Kingdom | 219/345 |
| 1408765 | 10/1975 | United Kingdom . | |
| 1480833 | 7/1977 | United Kingdom | 219/365 |
| 1501918 | 2/1978 | United Kingdom . | |

Primary Examiner—A. Bartis
Attorney, Agent, or Firm—Craig and Antonelli

[57] ABSTRACT

An electric heating device for heating the interior of a cabinet containing electrical apparatus, such as a switch or distribution apparatus, to prevent sweating or condensation therein, includes at least one PTC electrical resistance heating and temperature self-regulating heating element situated in the interior of an elongated body made of thermally conductive material that is thermally connected to a radiator. The radiator is formed by a pair of flat base plates extending laterally from opposite sides of the body and radiator fins extending only from the base plates and only from one flat side thereof. The body is a massive hollow element having a wall thickness greater than that of the base plates and fins and a height greater than the thickness of the base plates. The body, base plates and fins are formed as a one piece extrusion. A permanent magnet may be used to secure the body to the interior surface of a steel cabinet.

8 Claims, 3 Drawing Figures

ELECTRIC HEATING DEVICE FOR HEATING THE INTERIOR OF A SWITCH CABINET

This invention relates to heating devices for keeping the air temperature within cabinets or boxes containing electrical apparatus, such as switch or distribution equipment, at a level at which precipitation of water of condensation does not occur. While the application of such devices is not limited to cabinets or boxes containing switches, it will be convenient to refer to them herein as switch cabinet heating devices.

For the purpose of producing the necessary heat such devices may comprise an electrical resistance heating element which may be connected constantly to a current supply and is thermally conductively connected to a heat dissipating means or radiator which comprises for example, in the manner of conventional semiconductor cooling elements, a base plate with radiator fins or ribs applied to or formed on the said plate. When installed for operation, the heating device is arranged with the radiator fins vertical, so that a convection flow will be formed, whereby the air, heated at the radiator, rises and is circulated in the interior of the switch cabinet. The temperature in the interior of the switch cabinet should be at such a level as to obviate reliably any precipitation of water, but excessively high temperatures should be avoided so as not to impair the operation of the electrical apparatus situated in the switch cabinet. In order that this can be guaranteed even under varying ambient conditions, the supply of current to the electrical resistance heating element must be appropriately regulated; this has been achieved hitherto under the control of a regulating element. Switch cabinet heating devices of this kind also usually comprise a securing arrangement with which they can be secured in the interior of the switch cabinet, to the wall thereof.

In a known switch cabinet heating device of this kind (cf. German Utility Model No. 73 23 567) resistance heating elements made of conventional resistance wire are arranged in the interior of a sheet metal housing and pressed against the base plate of the radiator. The regulation of current is achieved by means of a thermostat which is also arranged in the sheet metal housing and is in thermal communication with the resistance heating elements, substantially by radiation. With this known heating device there is only an unsatisfactory regulation of the air temperature in the switch cabinet interior. The regulation of the current supply to the resistance heating elements is determined substantially only by the indirect transfer of heat between the latter and the thermostat and also by the thermal inertia and heat dissipation thereof. On the other hand the air temperature in the switch cabinet interior, which it is intended to regulate, has only a negligible influence on the control function.

An object of the invention is to provide a heating device which is notable for its improved regulation properties and at the same time is reliable in operation and also can be produced at relatively low cost. Besides precision in regulation, the relative freedom from developing faults is of considerable importance, since usually such heating devices operate continually over long periods of time.

According to the invention there is provided a heating device for warming the interior of a cabinet containing electrical apparatus, said device comprising a radiator and at least one electrical resistance heating element which is connected in thermally conductive manner to the radiator and also serves as a regulating element, the combined resistance heating element and regulating element being constituted by a PTC element which is situated in the interior of a body made of thermally conductive material which is connected in thermally conductive manner to the radiator.

PTC elements are known per se, usually consist of a ceramic material, for example with a barium titanate base, and have the property of effecting self-stabilisation, as it were, of their electrical power consumption. In the cold state their resistance is small and consequently a relatively high current passes, with a given electrical voltage, so that the operating temperature is reached in a short time, with the intended operating resistance. If for any reasons the temperature of the PTC element rises above a transition temperature, characteristic of the particular material, the resistance rises considerably and so the electrical power converted is reduced.

In the known devices mentioned above the unsatisfactory control action may be ascribed to the fact that there is a lack of a clear relationship between the air temperature in the switch cabinet, the temperature of the regulating element and the instantaneous power consumption of the resistance heating element. In devices according to the invention the resistance heating element itself provides the regulating function, since it is in the form of a PTC element, and this element is disposed in close thermal communication with the radiator. This is achieved by situating the PTC element in a special contact body connected in thermally conductive manner to the radiator. This arrangement at the same time gives an extremely simple, inexpensive construction which is very unlikely to develop faults. Of course, depending on actual requirements, one or more PTC elements can be provided in a common contact body or in a plurality of contact bodies.

The contact body preferably comprises a massive hollow element, in the hollow interior of which the PTC element is cemented-in with thermally conductive cement, for example suitably adjusted silicone rubber. Massive in this case means that the contact body—in contrast to a sheet metal housing for example—has relatively large material cross-sections. This is the case for instance if the wall thickness of the contact body corresponds substantially to the cross-section dimensions of the hollow interior. The contact body can be constructed for example as a metal block with a housing bore which is open at one end. A further possibility is to construct the contact body as a length of extruded section material. In any case the thermally conductive connection between radiator and contact body can be brought about for example by screwing the latter to the base plate of the radiator with the use of laterally formed-on securing flanges, and it is advisable to introduce a heat-conducting paste between the abutment surfaces.

In another constructional form, which is notable for particularly advantageous thermal properties, with low-cost production, radiator and contact body are made in one piece as an extruded section.

The radiator may comprise a flat base plate with radiator fins or ribs applied to one surface of the plate. With such an arrangement the contact body is attached to that surface of the base plate which is opposite from the radiator fins and the contact body is provided with securing elements for fixing the switch cabinet heating device to the housing of a switch cabinet. This means that the heat dissipation which is unavoidably connected with fixing to the switch cabinet housing proceeds not from the radiator but directly from the contact body. In this way the result is achieved that the transfer of heat from the PTC element to the radiator fins, which is important to the control function, is not disturbed by the dissipation of heat to the housing. As securing elements there can be provided clips which can be latched into corresponding shape-interlocking connection means provided on the switch cabinet housing. A further possibility is to provide as securing elements holding magnets which readily adhere with sufficient security to a sheet steel housing.

Embodiments of the invention will now be described in detail, by way of example, with reference to the accompanying drawings in which.

Figure 1:
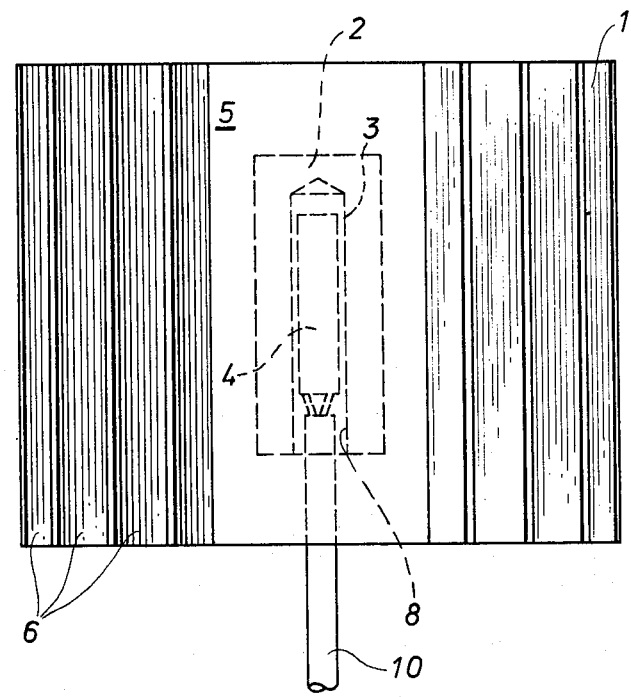
FIG. 1 shows a heating device, designed for switch or distribution cabinets or boxes, in what may be regarded as a plan view.
Figure 2:
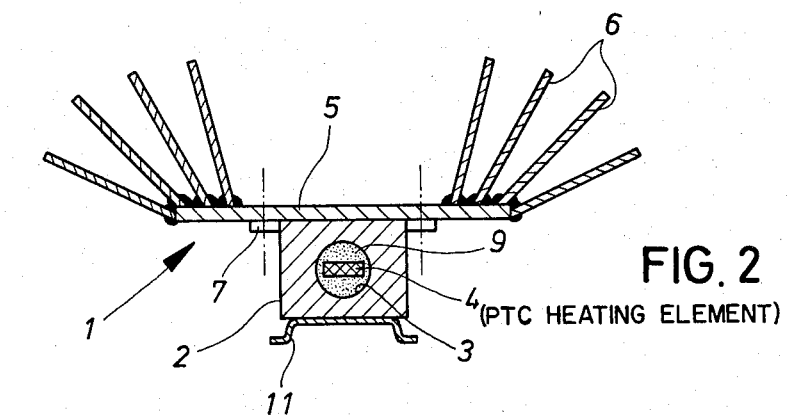
FIG. 2 shows the subject of FIG. 1 in transverse cross-section.

The heating device shown in FIGS. 1 and 2 comprises basically a heat-dissipating means or radiator 1, a contact body 2 connected in thermally conductive manner with the radiator 1, and a resistance heating element 4 which is situated in a cavity 3 of the contact body 2.

In this constructional example the radiator 1 comprises a flat base plate 5 and radiator fins 6 which are applied (conveniently by welding as indicated in FIG. 2) to what may be regarded as the upper side of the base plate 5, in the side regions thereof, and may conveniently be of uniform thickness over their length.

At the lower side of the base plate 5, opposite from the radiator fins 6, there is disposed the contact body 5 which consists of a massive block of material of good heat-conducting properties, for example aluminum, and is firmly secured to the base plate 5, for example by means of screws through lateral fixing flanges 7, preferably with interposition of a heat-conducting paste.

The resistance heating element 4 is a PTC element in the form of a small plate of a ceramic material with a positive temperature coefficient of electrical resistance, which is inserted into a blind hole 8 of the contact body 2 and cemented-in with thermally conductive material, preferably silicone rubber 9. The PTC element 4 is provided, at oppositely situated contact surfaces, with a metallisation to which the conductors of a connecting cable 10 are bonded (conveniently soldered), this not being shown in detail. Instead of being closed at one end, as shown, the cavity 3 may alternatively be open at both ends, in which case the contact body 2 may be formed as a length of extruded section material.

Figure 3:
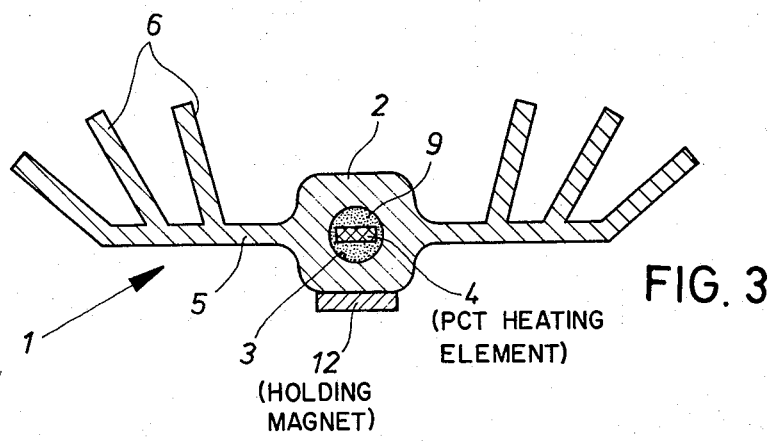
FIG. 3 shows another constructional form of such a heating device in transverse cross-section.

The constructional example shown in FIG. 3 has substantially the same basic arrangement. Here, however, the radiator 1 and the contact body 2 with the cavity 3 are formed integrally as a portion of a length of extruded section and accordingly the cavity 3 is open at both ends.

In each of the illustrated constructional examples a securing element is provided on the contact body 2 for securing the switch cabinet heating device to the housing (not shown) of a switch or distribution cabinet or box to be heated. The securing element may take the form shown in FIGS. 1 and 2, in which it comprises a clip 11 which can be latched into suitable shape-interlocking connection means on the said housing. Alternatively it may take the form shown in FIG. 3, namely a holding magnet 12 which is secured adhesively on the rear or lower side of the contact body 2 and is such as to hold the device on a sheet steel housing.

What is claimed is:

1. A heating device for warming the interior of a cabinet containing electrical apparatus, said heating device comprising at least one PTC electrical resistance heating and temperature regulating device which is situated in the interior of a body made of thermally conductive material that is connected in a thermally conductive manner to a radiator, said radiator comprising a pair of flat base plates projecting from opposite sides of said body and radiator fins extending only from said base plates and only outwardly from one flat side thereof, wherein said body is a massive hollow element having a wall thickness greater than that of said base plates and fins and a height substantially greater than the wall thickness of said base plates, and wherein said body, base plates and fins are unitarily formed as a one piece extrusion.

2. A heating device according to claim 1, wherein said massive hollow element is elongated, said flat base plates are connected along the length of said opposite sides so as to extend from the center thereof in a common plane extending laterally of said massive hollow element, and said fins extend lengthwise along said base plates parallel to said massive hollow element.

3. A heating device according to claim 1 or 2, wherein said body projects from said base plate on a side opposite to the radiator fins, and wherein a securing element is attached to said body at said opposite side.

4. A heating device according to claim 3, wherein said securing element is a magnet.

5. A heating device according to claim 1, wherein said massive hollow element is elongated.

6. A heating device according to claim 1, wherein said PTC element is cemented into a cavity within said massive hollow element with thermally conductive cement.

7. A heating device according to claim 1, wherein said massive hollow element has a cavity that is open only at one end and within which said PTC element is situated.

8. A heating device according to claim 1, wherein said fins are inclined relative to said base plate.

* * * * *